United States Patent Office 3,015,553
Patented Jan. 2, 1962

3,015,553
SLAG REDUCTION PROCESS
Arthur F. Johnson, Boulder, Colo., assignor to Strategic Materials Corporation, New York, N.Y., a corporation of New York
No Drawing. Filed July 1, 1960, Ser. No. 40,158
8 Claims. (Cl. 75—24)

This invention relates to the treatment of slags resulting from the burning of coal, and has for its object the provision of an improved process for the reduction of the iron oxide contained in the slag and the conversion of the reduced slag into useful products. More particularly, the invention provides a process for heating the slag with a reducing agent at a temperature sufficient to reduce the iron oxide and melt the remaining slag, followed by rolling of the reduced liquid or plastic slag and its contained metallic iron into thin sheets. After suitably crushing or shattering the resulting sheets the iron is separated from the flat slag flakes thus produced to recover the iron as well as the slag component in the form of separate valuable commercial products.

In accordance with my invention, I prefer to take the slag from power plants while hot, preferably molten, and reduce it with carbon, preferably coke, in a blast furnace, cupola, or electric arc furnace. When using a stack furnace such as the blast furnace or cupola, the slag, preferably molten, is introduced into the top portion and allowed to percolate down over the charge of coke which is heated to a white heat by air or oxygen blown in through the tuyeres. The FeO and $Fe_2O_3$ contained in the slag are reduced to iron and this results in an increase in the melting point of the slag. Lime or limestone may be added to lower the melting point, but I prefer not to add the lime or limestone as the viscous slag retains the particles of reduced iron in suspension. The thick but liquid slag is tapped out of the tap hole with its suspended or entrained metallic iron. This liquid slag is then rolled out into a thin sheet in apparatus of the type now used in making glass. For purposes of the present invention, however, I have found it advantageous to roll the slag into much thinner sheets, for example from $1/32$ to $1/8$ inch. Because of the greater density of the iron in the reduced slag mass, the iron particles will not be uniformly distributed in the slag body, but will form globules in the rolled sheet. As a result, some of the flakes resulting from the subsequent shattering of the sheet will consist essentially of iron particles while others will contain a relatively lesser amount of the iron particles and still others will be substantially free of iron.

The flakes from the shattering operation are subjected to magnetic separation during which the iron-containing flakes are separated from those flakes which are substantially free from iron. The latter flakes can be used, for example, to coat tar paper or felt roofing. The iron-containing flakes are a valuable source of iron. The flakes which contain a relatively lesser amount of iron globules suspended in the slag are removed from those substantially free of iron globules by magnetic separation which is more intense than that necessary to attract iron globules free of slag. These lower-quality flakes are then returned to the crusher for shattering to release the iron globules. It should be noted that the globules of iron imbedded in the flat flakes of slag are inherently very susceptible to magnetic separation, due to the fact that the flakes of slag containing iron globules naturally lay in an even, flat layer on the moving belt in close proximity to the magnets. A roll crusher is generally used so as to produce a minimum of fines in this graded crushing and magnetic separating operation. Any fines that are produced are returned to the surface of the furnace charge where they are used to absorb heat otherwise lost by radiation from the molten slag.

The object of the slag sheet forming, shattering, and magnetic separating operation is not only to recover the iron globules, but also to produce dense, tough slag flakes, similar to slate granules, which have a high covering power and are of substantial value when used as roofing material.

Heretofore most slag from power plants has been chilled and shattered by pouring it into a jet of water. The resulting granules are intersected to the core with heat contraction cracks and may be readily crumbled in the fingers. The value of such granules is low, as they may be used only for ballast or mixed with bitumin for use in road surfacing, and they bring a dollar or two per ton at best. They are unable to meet the specifications for roofing granules, which have a value of about ten dollars per ton, and if coated with coloring material, from twenty to thirty-five dollars per ton.

At the present time, most slag from iron blast furnaces is dumped while molten onto a slag dump where it is air cooled into a porous mass, the porosity resulting from gas evolved during freezing. Heretofore, when an attempt has been made to recover the iron globules from such massive slag it has always been necessary to break it up in situ and then grind the resulting chunks to a particle size small enough to permit substantial separation of the dispersed iron. It is considered that extensive grinding or fine comminuting of the slag is necessary in order to be able to recover the iron particles by magnetic separation. While such a method of treating the slag is effective for the recovery of the reduced iron, the finely-comminuted slag particles are not useful as roofing granules, a product form commanding a relatively high price, although they do find utility for aforementioned uses at an average value (1958) of $1.59 per ton.

In essence, therefore, I have discovered that the iron particles resulting from the reduction of iron oxide from materials of the general class described are not uniformly dispersed throughout the slag, but rather, are formed into globules within the slag. On the basis of this observation, the invention provides a unique method for treating the slag so that the iron values can be recovered therefrom (as much as $10.50 per ton of slag), while retaining the slag particles in the very desirable and economically superior flake form. As noted above, this method consists essentially of rolling the reduced, viscous slag into sheet form and shattering the sheet. The product of the shattering process is essentially flakes, some of which are primarily iron and others of which are primarily iron-free. Some intermediate-grade material is also produced, along with a small percentage of non-magnetic fines, which material is preferably recycled to the furnace. The high-iron flakes are separated magnetically and sold for their iron content. The other flakes find direct utility as coating material for tar paper and felt roofing, for which they are eminently suitable. In utilizing the method of treatment here described, it is thereby possible to recover two valuable products under conditions in which it has heretofore been possible only to recover the finely ground iron and the substantially less valuable slag granules.

It is believed that a clearer understanding of the advantages of the present invention may be had by referring to the following table, where the degree of iron-separation by fine-grinding, as has been practiced previously, and by rolling and shattering, as practiced in accordance with the present invention, is shown, along with comparative figures showing the commercial value of the respective products produced by the two methods:

Table

RECOVERY OF IRON AND SLAG BY-PRODUCT

| Grinding | | Flaking | |
|---|---|---|---|
| Pct. Fe in Slag | 18.4 | Pct. Fe in Slag | 18.4 |
| Pounds Fe recovered from 1 ton of slag. | 295 | Pounds Fe recovered from 1 ton of slag. | 279 |
| Pct. of Fe recovered | 80 | Pct. of Fe recovered | 76 |
| Value of Fe recovered | $9.70 | Value of Fe recovered | $0.27 |
| Pounds of slag granules recovered. | 1,700 | Pounds of slag flakes recovered. | 1,632 |
| Value of granules | $1.35 | Value of flakes | $8.16 |
| Total value of recovered products. | $11.05 | Total value of recovered products. | $17.43 |

Another embodiment of my invention involves adding coloring agents to the surface of the slag sheet as it is produced, thereby increasing the value of the granules obtained to the order of from twenty to thirty-five dollars per ton. In practicing this embodiment, I sift, spread, or blow a coloring flux onto one or both sides of the slag sheet (as it emerges from the rolls at a temperature of from 1500° to 2600° F.). This flux has a sufficiently low melting point so as to fuse onto the surface of the sheet, where it freezes as the entire sheet cools in the air. After the slag sheet has been fractured and the iron values magnetically removed, the slag granules may be further cured in a rotary kiln at an elevated temperature to melt and spread the color flux evenly onto the fractured surfaces. Coloring fluxes used for this purpose may be any of the well-known compositions having a low melting point due to constitutents such as phosphates, borates, or lithium and sodium salts, and which contain metal oxides such as zinc, chromium, iron, or cobalt oxide or the like. When the reduced slag is high in silica and alumina, it is also suitable for use as an addition agent in cement manufacture. For this purpose, it may be mixed with lime without burning to make a pozzuolanic cement. When the alumina is high enough it may be used to make a fast-setting cement.

The coal used extensively in this country and Canada in power plants contains ash amounting to from 5% to 20% of the weight of the coal. The plants which burn pulverized coal in cyclone type burners have a difficult problem in the disposal of the fused ashes which are abrasive, difficult to crush, and pump to disposal areas. The following is a typical example of the composition of such slags:

| | Percent |
|---|---|
| Silica | 43 to 46 |
| Ferrous oxide (FeO) | 22 to 25 |
| Ferric oxide ($Fe_2O_3$) | 4 to 8 |
| Aluminum oxide | 15 to 30 |
| Calcium oxide | 2 to 10 |
| Magnesium oxide | 0.5 to 1.0 |
| Sulphuric anhydride | Less than 0.5 |
| Carbon | 0.1 |
| Alkali oxides | 0.25 |
| Chlorine | 0.25 |
| Moisture | 0.25 |

The slag is too high in iron oxide for use as a cement additive and is black, making it unsuitable for use as a roofing material, except for black roofs.

In one aspect of the invention I use the fly ash from the power plant as a source of carbon for reduction and as a slag material to form byproduct iron and reduced slag. The fly ash is usually recovered from the burners by electrostatic precipitators or cyclone separators. Fly ash contains about the same slag-forming constituents as in the above table and an average of about 4.5% of carbon. There is more carbon in the fly ash than is necessary to reduce its own iron oxide content and the excess serves as a reducing agent for the main body of slag. When using a blast furnace, the fly ash can be blown in through the tuyeres with the oxidizing air. When using an electric furnace the fly ash may be added with the coke and spread on top of the charge. When this is done, an additional advantage obtains in that the fly ash decreases the radiation loss from the molten slag and protects the coke from oxidation by the furnace atmosphere.

In carrying out a typical operation of the invention in a blast furnace, the slag from the power plant in a liquid state is poured into the top of the furnace and allowed to flow down over the white-hot coke. The fly ash may be blown in through the tuyeres to supplement the slag and reducing carbon. About 90% of the iron content of the slag is reduced. Because of the viscous nature of the slag the iron particles are trapped in the slag. The slag may be tapped continuously or accumulated on the hearth and tapped intermittently. I prefer to pass the slag directly to a rolling apparatus similar to that used for making glass plates, where it is rolled, shattered, and separated as described hereinbefore.

When it is desired to use the reduced slag for cement additions, the slag from the blast furnace can be cooled by spraying with water to pulverize it or it may be crushed in any suitable way, to free the iron which is separated by a magnetic separator. Any material containing both slag and iron can be returned to the furnace. The following is the average analysis of the reduced irons:

| | Percent |
|---|---|
| Carbon | 0.5 to 4.25 |
| Silicon | 0.1 to 3.0 |
| Manganese | 0.1 to 1.5 |
| Phosphorous | 0.25 to 1.6 |
| Sulphur | 0.03 to 1.0 |

When using an electric furnace of the direct arc type it is desirable to use an acid lining because of the high silica and alumina content of the reduced slag. The operation is carried out in batches by pouring the slag into the furnace and adding the coke, with or without, fly ash. It is possible when using an arc furnace to heat the slag to such a fluid state that the reduced iron separates in the furnace and both the slag and iron can be separated by pouring from the furnace.

My invention comprehends the provision of a special sheet-forming apparatus comprising an endles belt, either as a unitary sheet or formed of connected segments, driven around two main rollers, the upper horizontal surface of which is held flat by a plurality of closely spaced supporting rollers. A pressure roller is mounted over the belt and directly over the main rollers at the entering end. The slag is poured through a trough and directly between the pressure roller and the belt. The slag is pressed out to a thin sheet and pases along on the belt which is driven at the same speed as the pressure roller. The slag can pass from the belt betwen corrugated rollers which shatter it into fairly uniformly sized flakes.

This application constitutes a continuation-in-part replacement of my former copending application Serial Number 700,967 which was filed on December 6, 1957, and has since been abandoned.

Having thus described the subject matter of my invention, what it is desired to secure by Letters Patent is:

1. Process of treating the slag from burning coal which comprises passing the hot slag into a furnace, reducing with hot carbon the major portion of the iron oxide to iron, removing the slag and the reduced iron contained therein from the furnace, rolling the reduced slag into a thin sheet, shattering the sheet and separating the reduced iron, leaving the slag in the form of small flakes.

2. In the process of claim 1, passing the slag while in a molten state into a blast type furnace and reducing the iron oxide therein with coke.

3. In the process of claim 1, passing fly ash into the furnace to supplement the slag and reducing agent.

4. In the process of claim 1, separating the reduced iron with a magnetic separator.

5. The process of treating the slag from burning coal which comprises passing the hot slag into an electric furnace, adding coke to the slag to reduce the major portion of the iron, pouring the slag and its suspended reduced iron from the furnace, passing the slag through a rolling means to form a thin sheet of slag containing the reduced iron, shattering the sheet into small flakes and releasing particles of the iron, separating the iron from the slag, and recovering a reduced slag in the form of small flakes.

6. In the process of claim 5, spreading onto the slag surface in the furnace a substantial amount of fly ash to supplement the slag and reducing agent.

7. In the process of claim 5, the improvement that comprises applying a coating of a colored mineral oxide flux in powdered form to one surface of said thin sheet of slag as said thin sheet of slag issues from said rolling means, said flux being fusable at the temperature of said slag sheet, whereby a color is imparted to said recovered small flakes.

8. In the process of claim 7, the improvement that comprises applying a coating of said oxide flux to both surfaces of said thin sheet of slag.

References Cited in the file of this patent

UNITED STATES PATENTS

| | | |
|---|---|---|
| 959,720 | Croxton | May 31, 1910 |
| 964,348 | Webster | July 12, 1910 |
| 1,582,318 | Van De Mark | Apr. 27, 1926 |
| 1,815,318 | Baily | July 28, 1931 |
| 1,937,039 | Johnson et al. | Nov. 28, 1933 |
| 2,780,889 | Fulk | Feb. 12, 1957 |